United States Patent [19]
Robbins, III

[11] Patent Number: 5,119,960
[45] Date of Patent: Jun. 9, 1992

[54] DEVICE ADAPTED TO ASSIST IN MAINTAINING THE OPEN CONDITION OF A BAG

[76] Inventor: Edward S. Robbins, III, 459 N. Court St., Florence, Ala. 35630

[21] Appl. No.: 598,973

[22] Filed: Oct. 17, 1990

Related U.S. Application Data

[63] Continuation-in-part of Ser. No. 13,627, Feb. 11, 1987, Pat. No. 5,048,977.

[51] Int. Cl.⁵ .............................................. B65D 67/12
[52] U.S. Cl. ...................... 220/640; 220/908; 383/33
[58] Field of Search .................... 220/403, 404, 85 F, 220/655, 90, 90.6, 640, 908; 383/119, 104, 33; 248/99

[56] References Cited

U.S. PATENT DOCUMENTS

| | | | |
|---|---|---|---|
| 1,421,628 | 7/1922 | Watkins | 220/401 |
| 1,738,295 | 12/1929 | Hardy | 220/655 |
| 1,911,724 | 5/1933 | Stein | 220/404 |
| 3,233,644 | 2/1966 | Bono | 220/655 X |
| 3,893,649 | 7/1975 | Cornell et al. | 383/33 X |
| 4,026,340 | 5/1977 | Sobolik | 383/33 X |
| 4,787,753 | 11/1988 | Barnhart | 383/33 |
| 4,890,757 | 1/1990 | Robbins, III | 383/119 X |
| 4,946,065 | 8/1990 | Goulter et al. | 220/404 |
| 5,048,977 | 9/1991 | Robbins, III | 383/119 |

*Primary Examiner*—Steven M. Pollard
*Attorney, Agent, or Firm*—Nixon & Vanderhye

[57] ABSTRACT

A device for maintaining the mouth of a bag in an open condition includes an annular body member which defines a central cavity sized and configured to accept a region of the bag's mouth therein (preferably in friction fit relationship). The body member is formed of a resilient, shape-retaining material (e.g., plastic) so as to radially outwardly bias the bag mouth to maintain the same in an open condition. A pair of manually operable wing members diverge from the body member relative to the respective sides of the defined cavity. The wing members collectively cause the cavity to dimensionally increase in response to a manual inward pressure being applied thereagainst so as to facilitate engagement-/removal of the body member with the bag mouth.

12 Claims, 2 Drawing Sheets

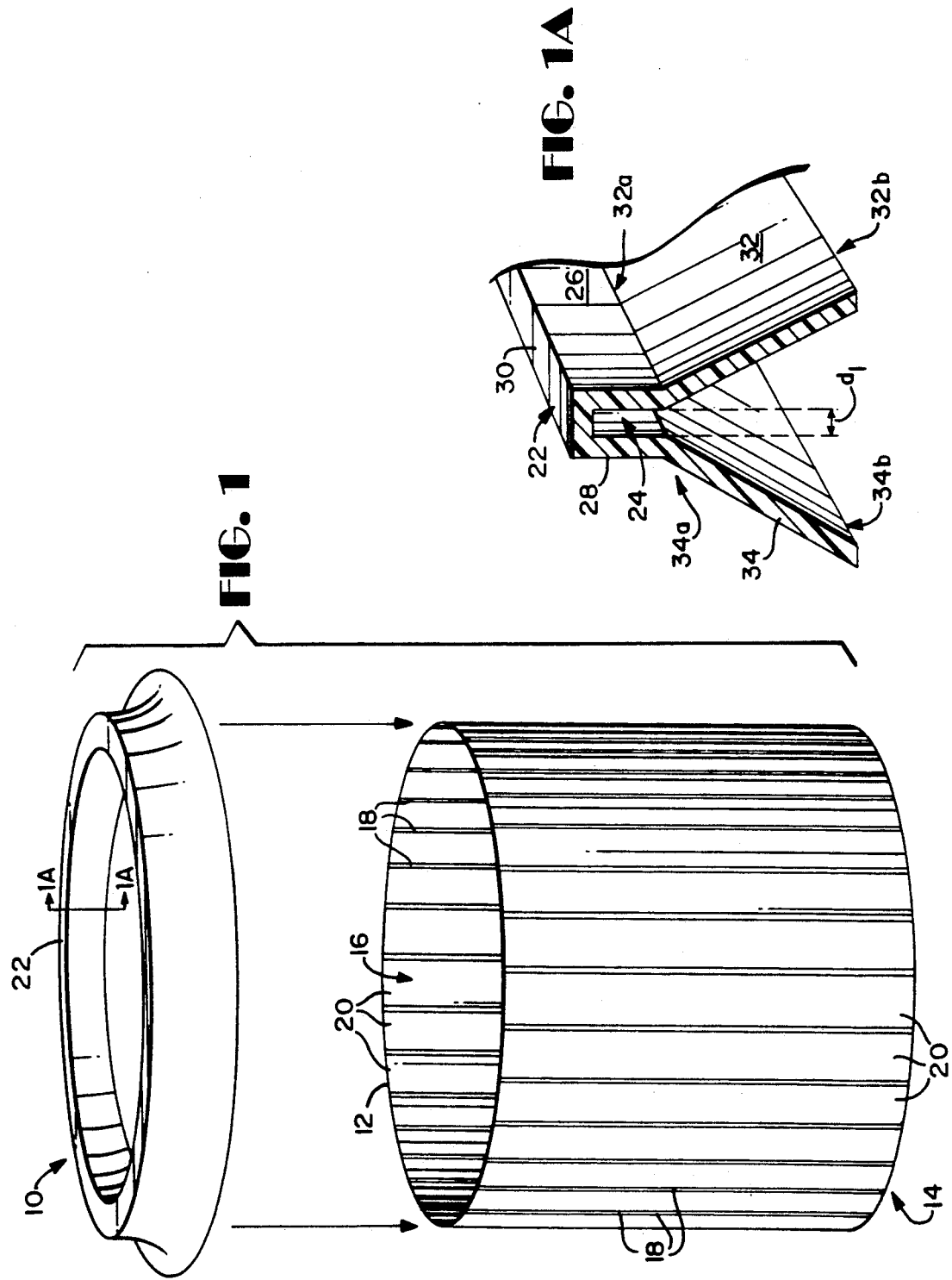

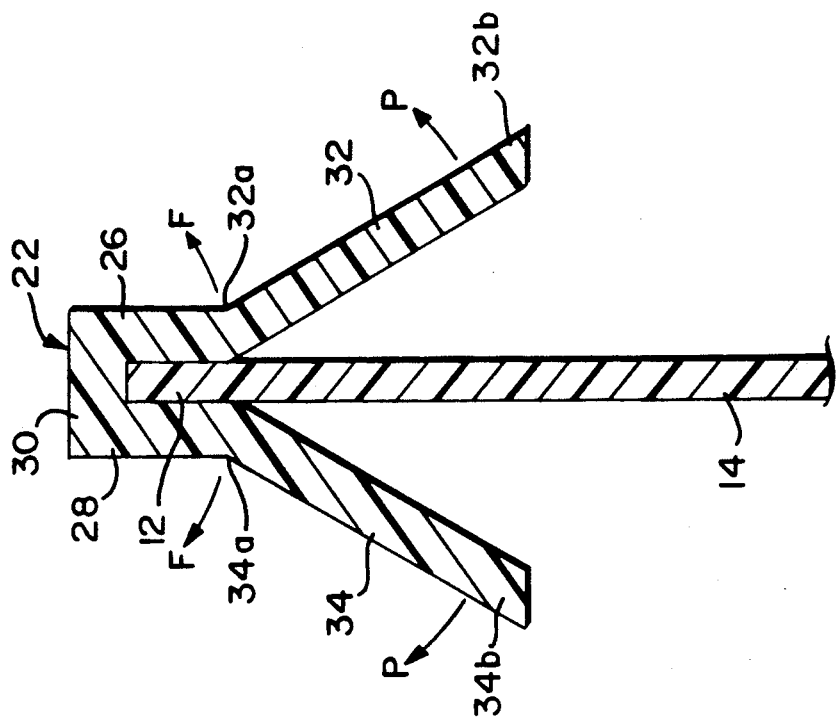
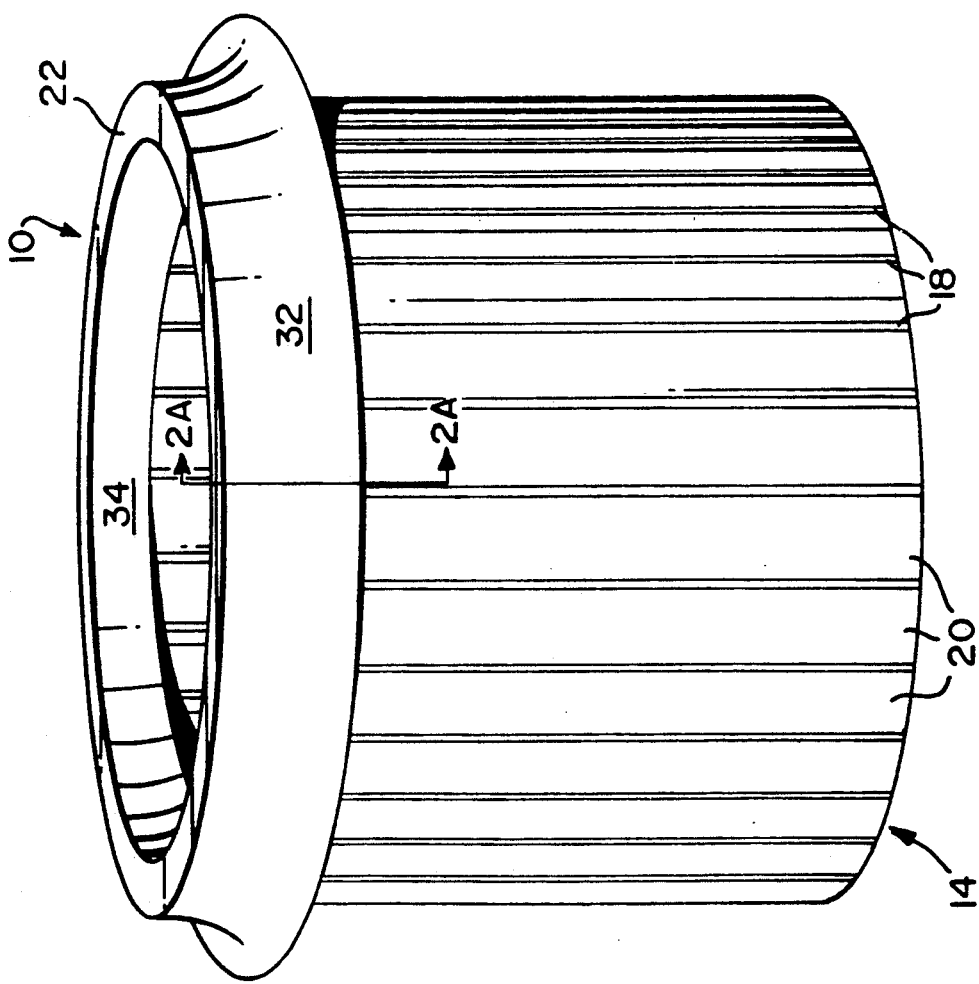

DEVICE ADAPTED TO ASSIST IN MAINTAINING THE OPEN CONDITION OF A BAG

CROSS-REFERENCE TO RELATED APPLICATIONS

This application is a continuation-in-part of commonly owned, copending U.S. patent application Ser. No. 013,627 filed on Feb. 11, 1987 in the name of the Applicant herein and entitled "Ribbed Enclose" (now U.S. Pat. No. 5,048,977), the entire content of this prior application being expressly incorporated hereinto by reference.

FIELD OF INVENTION

This invention generally relates to the field of containers, such as bags. More specifically, the invention relates to devices adapted to assist in maintaining such containers in an "opened" condition. The invention is preferably embodied in a similarly configured annular cavity for accepting upper edge region of the bag in close fitting, frictional engagement. The inherent resiliency of the material from which the device is constructed, coupled with the device's annular configuration collectively radially bias the upper part of a bag outwardly thereby assisting in maintaining the bag in an open condition.

BACKGROUND AND SUMMARY OF THE INVENTION

A novel self-supporting enclosure (e.g., bag) is described in my copending application referenced above. That is, the bag described in my prior application includes a plurality of substantially non-deformable longitudinal ribs unitarily formed with a plurality of flexible webs. The webs serve to interconnect adjacent pairs of the ribs so that the ribs are circumferentially spaced about the bag's periphery.

Although the bag of my prior application is self-supporting (i.e., does not necessarily depend upon other structures for purposes of maintaining it in an upright open condition), when heavy objects are placed in the mouth of the bag (i.e., trash, leaves, or other relatively heavier objects) during use, they may strike the bag's mouth and thus cause it to be displaced inwardly. This may, in turn, lead to the bag's mouth being closed to an extent which would prevent other objects from being placed in the bag. At the very least, inward displacement of the bag's mouth might frustrate a user since the mouth would need to be reopened each time a relatively heavier object strikes it. As can be appreciated, such occurrences might detract from the bag's otherwise advantageous self-supporting feature. It is towards alleviating the above-mentioned problem that the present invention is directed.

According to the present invention, a device is provided which is preferably embodied in an annular body member having a central, preferably inverted U-shaped, cavity sized and configured to accept therein an upper edge region of the bag's side wall which defines the bag mouth. The body member is formed of any suitable resilient, shape retaining material so as to radially outwardly bias the bag's mouth when the body member is engaged therewith. In such a manner, the bag mouth is maintained in an open condition.

Means are provided according to this invention so as to facilitate the engagement of the body member with, and its removal from, the upper edge region of the bag with which it is used. In this regard, a pair of wing members are preferably integrally formed with the body member laterally of a respective side of the central cavity defined thereby. Thus, the wing members are preferably formed of the same resilient, shape-retaining material as that of the body member, but could be formed of a different material, provided it exhibits resilient, shape retaining properties. The wing members, moreover, preferably downwardly diverge relative to one another from the defined central cavity. When manual outwardly directed (i.e., relative to the bag's upper edge region) pressure is applied to the wing members, the body member in the area of the defined cavity will responsively be outwardly bowed or flexed thereby dimensionally increasing the size of the cavity and hence facilitating engagement/removal relative to the bag's upper edge region.

The wing member pairs preferably extend around the entire periphery of the body member. However, discrete pairs of wing members could be provided at circumferentially spaced-apart locations on the body member. In this latter alternative situation, these discrete pairs will likewise preferably be downwardly divergent so as to provide localized assistance to the user in engaging/removing the body member relative to the upper edge region with which the device is used.

Although plastic materials are preferred (e.g., thermoplastic materials such as, polyolefins, polyvinylchlorides, and the like), light-weight metals may also be employed in forming the body member of this invention. However, when consideration is given to the prospective commercial environment for this invention ≠ ≠ i.e., as an auxiliary product for disposable bags ≠ ≠ then the cost advantages associated with the manufacture of plastic devices becomes more apparent.

When utilizing plastic materials, the devices of this invention can be fabricated according to any well known plastic-formation technique. For example, the devices of this invention can be conveniently molded as a one-piece unitary structure. Alternatively, a continuous length preform could be extruded and then cut into desired lengths. These individual preform lengths may then be finally formed into an annular device by connecting each of the lengths' opposing ends (e.g., as may be accomplished with heat welding, adhesives or the like).

Other aspects and advantages of this invention will become more clear after careful consideration is given to the detailed description of the preferred exemplary embodiment thereof which follows.

BRIEF DESCRIPTION OF THE DRAWINGS

Reference will hereinafter be made to the accompanying drawings wherein like reference numerals throughout the various FIGURES denote like structural elements, and wherein;

FIG. 1 is a perspective view showing the device of this invention in a removed relationship to a bag with which it may be used;

FIG. 1A is a perspective cross-sectional view of the device shown in FIG. 1 as taken along line 1A—1A therein;

FIG. 2 is a perspective view of the device of this invention in an engaged relationship with an upper region of a bag; and FIG. 2A is a cross-sectional elevational view of the engaged device and bag shown in FIG. 2 as taken along line 2A—2A therein.

DETAILED DESCRIPTION OF THE PREFERRED EXEMPLARY EMBODIMENT

A preferred embodiment according to this invention is shown in the accompanying FIGURES. As is seen particularly with respect to FIGS. 1 and 2, the device 10 of this invention is embodied in an annular (i.e., ring-shaped) structure and is adapted to being placed in operative engagement with an upper edge region 12 of a bag 14 which defines the bag's mouth 16. Thus, the device 10 of this invention is capable of being engaged with, and removed from, the upper end region 12 of bag 14 as is shown in FIG. 1. The device 10 in an engaged relationship with the upper end region of bag 14 is shown in FIG. 2.

The bag 14 with which the device 10 of this invention is particularly adapted to be used is generally of the type described in my copending application mentioned above. That is, the bag 14 is self-supporting and includes a plurality of circumferentially spaced-apart substantially axially non-deformable ribs and flexible webs, a representative few of which are identified in FIGS. 1 and 2 by reference numerals 18 and 20, respectively. Moreover, the device 10 of this invention will provide a convenient means by which a user may grasp and thus more easily handle the bag.

The bag 14 with which the device 10 of this invention is employed is thus formed of a generally tubular side wall having a predetermined elongated linear extent so as to define an elongate axis of the bag 14. The side wall of the bag 14 is thus formed of a one piece plastic material and include a plurality of unitary, one-piece extruded ribs 18 continuously extending along the elongated linear extent of said side wall substantially parallel to the bag axis and at laterally spaced positions thereabout, and a plurality of flexible non-self-supporting webs. Adjacent pairs of the ribs 18 are unitary with, and interconnected by, a respective one of the flexible non-self-supporting webs.

The side wall of the bag 14 is movable away from and toward the bag's elongate axis between (a) an expanded position whereby the mouth 16 of the bag is opened and the ribs 18 are spaced laterally one from the other generally parallel to the bag's elongate axis so that the enclosure is in a generally tubular open condition, and (b) a collapsed condition whereby the ribs 18 are in closely spaced relation one to the other and to the bag's elongate axis with the webs 20 folded between the ribs 18.

At least the ribs 18 are formed of an extrudable high density polyethylene material and are of a thickness $t_2$ (preferably between 5-500 mils) which is sufficiently greater than a thickness $t_1$ (preferably 1-80 mils) of the interconnecting webs 20 so that the ribs 18 are substantially nondeformable along the elongated linear extent of the bag's side wall. The substantially non-deformable ribs thus provide the means by which the side wall of the bag 14 is self-supporting in the direction of its elongated linear extent when the side wall is in its expanded condition. The webs 20 may be formed of the same high density polyethylene material as the ribs 18, or alternatively, may be for form a completely different plastic material by using a coextrusion process.

The device 10 of this invention is generally comprised of a unitary annular body member 22 which defines an inverted U-shaped (i.e., open-ended) central cavity 24 which is more clearly seen by reference to FIG. 1A. That is, the body member 22 is established by a pair of spaced-apart side walls 26, 28 each being joined to a bottom wall 30. These walls 26, 28, 30 thus also serve to define the central cavity 24. It will be noted that the cavity 24 is open-ended (i.e., is closed at only one end by means of bottom wall 30) and thus establishes a normal cross-sectional dimension $d_1$ which is sized and configured to accept the upper region 12 of bag 14 therein, preferably in friction fit relationship as is seen more clearly with reference to FIG. 2A.

A pair of wing members 32, 34 are preferably integrally formed with the body member 22. The wing members thus preferably have one end 32a, 34a integrally connected to a respective one of the side walls 26 and 28 ≠ ≠ that is, laterally relative to a respective side of the defined central cavity 24 ≠ ≠ and extend downwardly therefrom to their respective free ends 32b and 34b. As is apparent in FIGS. 1A and 2A, the wing members 32, 34 diverge relative to one another from the central cavity, the purpose for which will be described below. The wing members 32 and 34 are shown in FIG. 1A and 2A as being substantially planar. However, they may be formed in opposing concave or other configurations (and hence still "diverge" relative to one another) as is generally shown in FIGS. 1 and 2.

Although the wing members 32, 34 are shown as being integral (i.e., unitary) with the body member 22, they may also be conveniently fabricated separately, in which case they may be fixed to the body member 22 by any suitable means, e.g., heat-welding, adhesives, or the like. In addition, the wing members 32, 34 are formed of a resilient, shape-retaining material which is not necessarily the same material as that used to form the body member 22.

The divergent arrangement of the wing members 32 and 34 allows a user to manually apply an outwardly directed pressure force thereupon as indicated generally by the arrows P in FIG. 2A. This pressure force, in turn, will cause the wing members 32 and 34 to bow or flex between their ends 32a, 32b and 34a, 34b, respectively, so as to exert an outward bias force F (see FIG. 2A) on the body member 22 near the open end of the defined cavity 24. The outward bias force F thereby responsively causes the central cavity to dimensionally increase ≠ ≠ that is, it will responsively increase from a dimension $d_1$ to a greater dimension $d_2$ ≠ ≠ so as to facilitate engagement and removal of the device 10 relative to the upper edge region 12 of bag 14. It will be appreciated therefore, that the wing members 32, 34 form levers of sorts which assist in the engagement/disengagement of the central cavity with the upper edge egion 12 of the bag.

The present invention therefore provides a device which maintains the mouth of a bag in an open condition while also providing the means which facilitate its operative association with the bag. Thus, although the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. The combination comprising:

(A) a self-supporting bag having an open end and including a plurality of axially extending, substantially non-deformable and self-supporting ribs interconnected by means of respective flexible and non-self-supporting webs; and (B) a device for maintaining said bag in an open condition, said device including,
 (i) an annular body which defines an open-ended annular cavity sized and configured to accept a region of said open end of the bag therein;
 (ii) said annular body consisting essentially of a resilient, shape-retaining material and further includes,
 (iii) a pair of manually operable wing members extending from said body on either side of said open-ended cavity, said pair of wing members acting upon said body near said open-ended cavity thereof in response to manual pressure being applied thereto which facilitates engagement and removal of said body relative to said open end region of the bag by exerting a resilient force upon said open-ended cavity of said body which tends to cause the same to dimensionally increase.

2. The combination as in claim 1, wherein said pair of wing members downwardly diverge relative to one another.

3. The combination as in claim 1, wherein said wing members are unitary with said body.

4. The combination as in claim 1, wherein said body consists essentially of plastic.

5. The combination as in claim 1, wherein said wing members are each substantially planar as viewed in cross-section.

6. The combination as in claim 1, wherein said wing members are each oppositely concave as viewed in cross-section.

7. The combination comprising:
(A) a self-supporting bag having a generally tubular side wall establishing an open mouth and having a predetermined elongated linear extent defining an elongate axis of the bag, said side wall being formed of a one piece plastic material and including (a) a plurality of unitary, one-piece extruded ribs continuously extending along said elongated linear extent of said side wall substantially parallel to said axis and at laterally spaced positions thereabout, and (b) a plurality of flexible non-self-supporting webs, adjacent pairs of said ribs being unitary with, and interconnected by, a respective one of said flexible non-self-supporting webs, said side wall being movable away from and toward said axis respectively between (1) an expanded position forming said bag wherein said ribs are spaced laterally one from the other generally parallel to said axis so that said enclosure is in a tubular condition with the mouth thereof being opened, and (2) a collapsed closely spaced relation to one another and to said axis with the webs folded between said ribs, said ribs being substantially nondeformable along the linear extent of said side wall, said substantially nondeformable ribs providing means by which said side wall is self-supporting in the direction of said elongated linear extent when said side wall is in said expanded position; and (B) a device for maintaining said bag in said expanded condition so as to maintain said mouth of said bag in an opened condition, said device including,
 (i) an annular body which defines an open-ended annular cavity sized and configured to accept a region of said open end of the bag therein;
 (ii) said annular body consisting essentially of a resilient shape-retaining material and further includes,
 (iii) a pair of manually operable wing members extending form said body on either side of said open-ended cavity and acting upon said body near said open-ended cavity in response to manual pressure being applied to said pair of wing members to facilitate engagement and removal of said body relative to said open end region of the bag by exerting a resilient force upon said open-ended cavity of said body which tends to cause the same to dimensionally increase.

8. The combination as in claim 7, wherein said pair or wing members downwardly diverge relative to one another.

9. The combination as in claim 7, wherein said wing members are unitary with said body.

10. The combination as in claim 7, wherein said body consists essentially of a plastics material.

11. The combination as in claim 7, wherein said wing members are each substantially planar as viewed in cross-section.

12. The combination as in claim 7, wherein said wing members are each oppositely concave as viewed in cross-section.

* * * * *